Figures 1, 2:
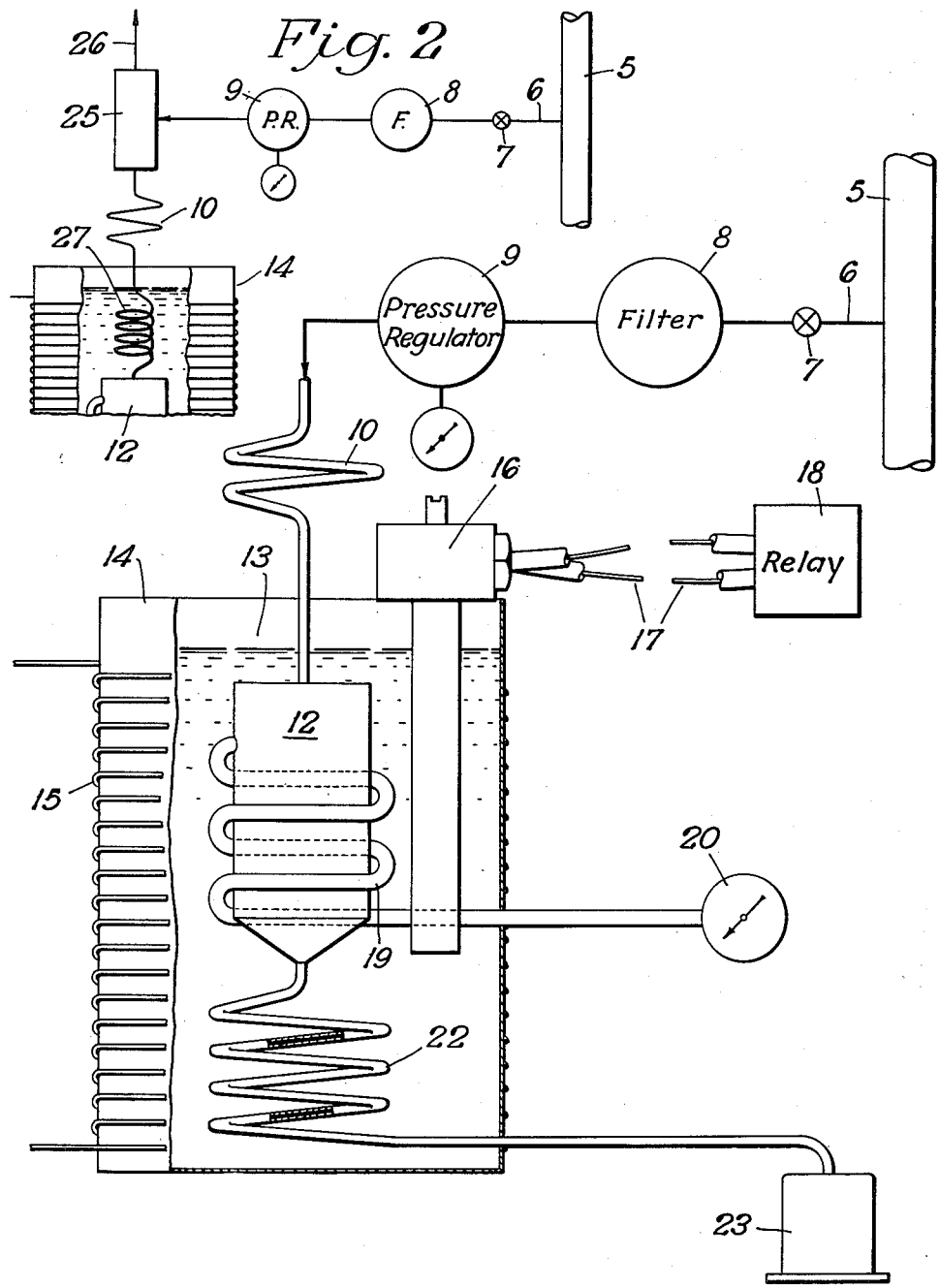

March 9, 1954  R. B. JACOBS ET AL  2,671,340
VAPOR PRESSURE DEVICE
Filed Jan. 28, 1950  2 Sheets-Sheet 1

INVENTORS:
Robert B. Jacobs
Sixt Frederick Kapff
BY *Olin E. Williams*
ATTORNEY

March 9, 1954  R. B. JACOBS ET AL  2,671,340
VAPOR PRESSURE DEVICE
Filed Jan. 28, 1950  2 Sheets-Sheet 2

INVENTORS:
Robert B. Jacobs
Sixt Frederick Kapff
BY Olin E. Williams
ATTORNEY

Patented Mar. 9, 1954

2,671,340

UNITED STATES PATENT OFFICE 2,671,340

VAPOR PRESSURE DEVICE

Robert B. Jacobs and Sixt Frederick Kapff, Homewood, Ill., assignors to Standard Oil Company, Chicago, Ill., a corporation of Indiana Application January 28, 1950, Serial No. 141,101

9 Claims. (Cl. 73—53)

This application relates to an improved apparatus and method for automatically determining the vapor pressure of liquids. It has particular reference to an apparatus that will automatically and continuously determine the nature of a liquid by measuring its vapor pressure under controlled conditions, particularly that of temperature. The invention has further reference to means for continuously determining and either recording the vapor pressure or controlling other apparatus and methods in response thereto.

As is well known, the vapor pressure of liquid can be determined automatically by withdrawing a sample continuously from a source of liquid and thereafter measuring the pressure exerted by the vapor of the liquid at a controlled constant temperature. This information has been employed in the past to identify or analyze phenomena wherein vapor pressure is a critical factor, and these findings have been used to control related operations. Examples of such operations are the blending of gasoline or the determination of the nature of the liquid flowing at any moment in petroleum pipelines. Apparatus heretofore supplied for the above operations have, however, been inherently complicated whereby they have admitted errors or they have in other instances permitted the accumulation of fixed gases within the apparatus whereby vapor pressure determinations were soon made invalid because a large part of the measured pressure was that of the said accumulated gases.

The primary object of the present invention is the provision of improvements in apparatus and method for determining the vapor pressure of liquids both continuously and automatically.

Another object of the invention is the provision of an improved continuous vapor pressure determining apparatus whereby the problem which has previously existed in the accumulation of fixed gases in the said apparatus is substantially entirely eliminated.

A futher object of the invention is the provision of a highly simplified method for the determination of the vapor pressure of a liquid which eliminates the need for moving parts or valves directly associated with the apparatus. The invention has for further objects such other advantages or results as will appear in the specification and claims hereinafter made.

Briefly stated, the present invention consists of a novel method and apparatus for determining the vapor pressure of liquids, the apparatus comprising the combination of two restricted passages, preferably capillary tubes, and, joined therebetween, an enclosed vapor zone to which is attached a pressure gauge, and a means for drawing a liquid whose vapor pressure is to be determined through the said capillary tubes. In performing the said novel method, the exit capillary and vapor zone is maintained at a constant temperature and this is usually most readily accomplished by immersion of said capillary and vapor chamber in a constant temperature bath. The liquid is delivered to the inlet capillary at a uniform pressure and is passed therethrough at a temperature below the boiling point of the said liquid at the said pressure. Upon reaching the intermediate vapor space, however, and by virtue of heat being absorbed from the surrounding atmosphere, the liquid should be raised to its boiling point at the pressure existing within the said zone. Vapors will thereby be formed in the vapor zone and when it is attempted to pass these through the second said capillary tube the increased volume of the substantially homogeneous vapor-liquid mixture or froth caused by the so-formed vapors will resist passage through the capillary tube and the resultant alteration in the reading of the pressure gauge will be observed. Adequate heat should be supplied to the vapor zone to prevent the passage of slugs of liquid through the second capillary; a froth should be uniformly introduced therein. When, for example, a vacuum is imposed on the said capillaries and vapor zones by a vacuum pump attached to the outlet of the second capillary tube, then the vapor pressure of a liquid will be exhibited by the volatilizing of some of the liquid in the vapor zone, the restricted and slow passage of the vapor-liquid mixture through the second capillary tube and the consequent reduction in the vacuum indicated on the vacuum gauge. Superheating of peripheral liquid passing through the second capillary and consequent pressure errors are avoided by employing tubes having interrupted, for example, roughened, inner surfaces to provide agitation of the flowing fluid. If the inner surfaces are very smooth, as in the case of stainless steel tubing, other means can be employed to interrupt streamlined flow; for example one or more small chambers of diameter slightly larger than that of the capillary tube can be inserted along the length of the tube.

In addition to maintaining the vapor chamber and outlet capillary in a constant temperature bath, there is preferably also disposed between the inlet capillary and the vapor chamber a tube of adjusted or selected length. The tube is also immersed in the bath and it is preferably coiled. Its proper length can be determined in each case by empirical means so that an optimum amount of heat transfer from the bath to the sampled liquid is maintained. A simple method is to start operation with a long tube and merely cut off small lengths until the correct relationship is obtained. The length of the tube should ultimately be adjusted so that the liquid, while partially vaporizing in the vapor chamber, will remain at a temperature below the wall temperature of the chamber and will leave the chamber while still at somewhat lower than chamber temperature.

By careful adjustment of the operating temperature range to fit each individual case, the described apparatus of invention can be employed in several industrial processes. The percentage of alcohol in water or of any component of a miscible binary system where the one component is of substantially different vapor pressure than the other can readily be determined by the aforesaid apparatus. The nature of the liquid in a petroleum-products pipeline, for example, whether the liquid be a gasoline or a diesel fuel or kerosene, can be indicated by the present apparatus. The paired capillary apparatus, including a gauge, is attached to a petroleum-products pipeline and a change in the product being transported therein will be rapidly indicated on the gauge chart. The pressure responsive means of the described apparatus can in turn be so connected as to operate suitable relays and automatically operable valves so that storage tanks at petroleum bulk stations can be filled with the proper product completely automatically and in response to a determination of the vapor pressure of the product being transported.

A further and improved application of the present invention is the provision of a continuously indicating aid in the blending of gasoline. Gasoline is now marketed under specifications based on the Reid method for vapor-pressure determination (ASTM D 323-42), which was originally devised in 1930. This method employs an apparatus comprising an air chamber, a Bourdon-type pressure gauge and a liquid sample chamber. The air chamber has fixed dimensions and openings designed to permit complete drainage of the chamber. The liquid sample chamber has the same inside diameter as the air chamber and a length sufficient to provide an overall vapor-to-liquid ratio of 3.8 to 4.2 when attached to the air chamber. In determining vapor pressure with this apparatus the sample liquid, having first been saturated with water and chilled, is introduced into the sample chamber, and the sample chamber is screwed into the air chamber. The assembled apparatus is shaken vigorously and immersed in a water bath maintained at a constant temperature (for gasoline, 100° F. plus or minus 0.2° F.) until the pressure reaches equilibrium.

The foregoing method provides reasonably accurate results, although it is subject to the usual human errors of manipulation. However, it is a comparatively slow precedure, requiring about a half hour or more for each determination, even when carried out by a skilled operator. Moreover, special facilities must be provided for taking samples of the gasoline stream, and the samples must be refrigerated until such time as the vapor-pressure determination can be made. From the point of view of the refiner, however, the most serious drawback of the method is its failure to provide information on the basis of which the blending operation itself can be satisfactorily regulated. In ordinary blending operations, as much as 5,000 barrels of gasoline per hour may be produced, during which the composition of the streams being blended may alter materially, thus influencing the properties of the product. If the operator must wait a half hour or longer after any change in the operating conditions before he can determine the effect of the change on the product, he obviously may be unable to prevent the occurrence of substantial deviations from the prescribed range of vapor pressure during such time.

Efforts have been made to devise equipment for measuring the so-called "true vapor pressure" of the blended gasoline by continuously passing a side-stream of the blend into an evaporating cup, and measuring the pressure developed therein. This technique can be employed successfully for measuring the vapor pressure of a liquid which contains no dissolved non-condensible gases; however, virtually all gasoline streams contain dissolved air and lower hydrocarbons, which come out of solution and accumulate in the evaporating cup, eventually rendering the device completely inoperative. For this reason, such vapor pressure apparatus has not proved successful in the regulation of gasoline-blending operations.

The apparatus of the present invention has been successfully employed in the continuous determination of gasoline vapor pressure in blending operations, in which case apparatus, hereinafter described in greater detail, was operated under a positive pressure, and included an inlet feed tube of adjustable or selected length so that substantial variations arising from deviations in viscosity of sample product could be effectively minimized.

Figure 3:
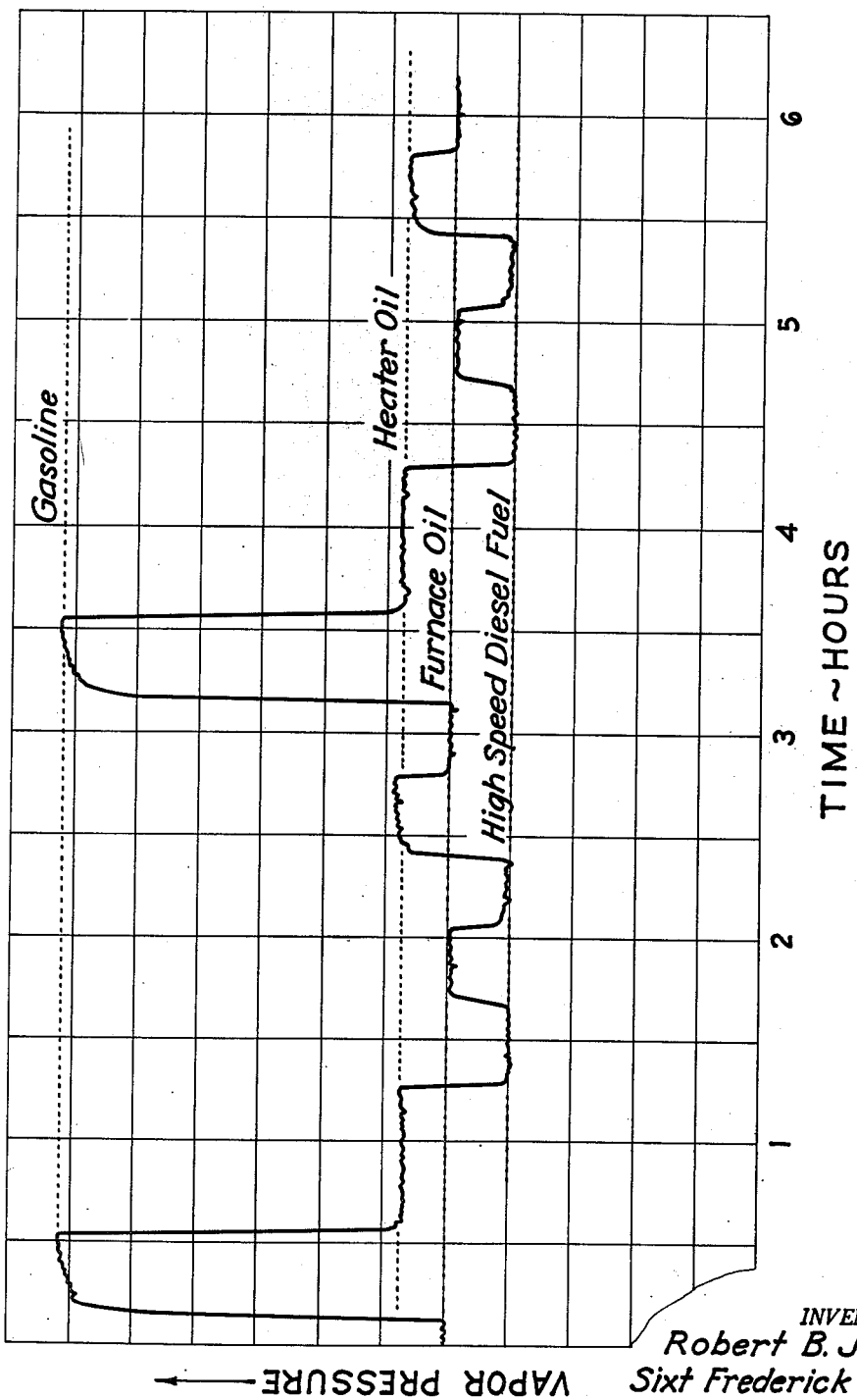

In the accompanying drawings which are supplied for the purpose of illustrating preferred embodiments of the apparatus and invention; Fig. 1 is a diagrammatic view showing in elevation and with parts broken away the dual capillary apparatus in combination immersed in a constant temperature bath; Fig. 2 is a schematic diagram with parts broken away showing an alternate arrangement of a part of the vapor pressure apparatus; and Fig. 3 is a representation of a gauge chart showing the information provided by the aforesaid apparatus when applied to a petroleum-products pipeline.

Referring now specifically to Fig. 1, a feed line 5 is tapped by sample line 6 having disposed therein a valve 7 that is kept open during continuous operation. The withdrawn sample flows through a filter 8 wherein rust particles and the like are removed. The sample then flows through a pressure regulator 9 having a gauge attached thereto and which is also disposed in said line 6. The filtered sample then flows into capillary feed line 10 of selected diameter and length. The sample flows from the capillary feed line 10 directly into a vaporizing vessel 12 which is totally immersed in a constant temperature bath 13.

The constant temperature bath 13 is contained in an insulated vessel 14 having a coil heater 15 wrapped concentrically about the said vessel 14. The said heater 15 is controlled in order to maintain the said bath 13 at a constant temperature by means of a thermocouple or cartridge thermoswitch apparatus 16 that is also immersed in the said bath 13. The thermoswitch 16 is connected by wires 17 to a relay 18 whereby a current is intermittently supplied to the heater 15 in response to changes in temperature of the bath 13 as determined by the thermoswitch 16. Other conventional means of maintaining the bath at constant temperature, such, for example, as an immersion heater and agitating device not shown, can be employed in place of the illustrated apparatus. An additional heater, not shown, can be supplied to the base of the vessel 14 to provide more uniform heating and thus improved temperature control.

To the said vaporizing vessel 12 is attached a gauge line 19 which is preferably liquid filled and which leads to a gauge 20. The gauge 20 indicates the variations in pressure that are provided by the vapor liquid mixture. It can be employed as an indicator whereby manual operation of valves can be regulated or else pressure responsive means not shown can be connected to the said liquid filled line 19, such, for example, as a diaphragm valve that will translate the difference in pressure exerted in line 19 to control means, not shown, whereby various specific operations can be performed, such as opening or closing valves in response to the so-determined differential vapor pressure.

Extending from the bottom of the said vaporizing vessel 12 and immersed also in the said constant temperature bath 13 is a second capillary 22. A vapor-liquid mixture formed in the vaporizing vessel 12 flows through the capillary 22 and is withdrawn by means of a vacuum pump 23 which operates with relative uniformity of capacity so that a uniform suction is placed upon the said vapor vessel 12 and the capillary tube 22. The inner surface of the capillary tube 22 is roughened to prevent streamlined flow.

Certain variables in the operation, for example, the length of the inside diameter of the capillary 22, or, within limits, the range of the allowed temperature of the constant temperature bath 13 can be adjusted so that the reading provided on the gauge 20 will be made to correspond substantially to the Reid vapor pressure of the particular sampled liquid.

In Fig. 2 the same elements of the apparatus as those shown in Fig. 1 have the same characters of reference. Fig. 2 shows an inlet sample line 6, a filter 8, a pressure regulator 9, having a gauge, and an air-liquid separator 25. Air or fixed gases that may have been in the sample are released through vent 26. Liquid flowing from the separator 25 flows through inlet capillary 10 which provides a uniform flow and could be replaced by an accurate uniform-flow pump. After leaving the inlet capillary 10 the liquid does not flow directly into the vapor chamber 12 as in Fig. 1, but instead flows through a tube 27 disposed therebetween.

The tube 27 is preferably coiled and is immersed in the constant temperature bath 13 in heat interchange relationship therewith. The diameter of the tube 27 is preferably from $\frac{1}{16}$ inch to $\frac{1}{4}$ inch. Its length is so selected or adjusted that liquid flowing therethrough will be heated only to a temperature considerably less than the temperature of the liquid in the outlet capillary and so that the liquid leaving the vapor chamber will be at a temperature slightly less than the temperature of the bath. This adjustment will provide a constant vaporizing of liquid in the chamber and in the outlet capillary. It has been found that maintaining this condition reduces variations due to differences of viscosity of sampled liquids to an insubstantial value not effectively influencing the vapor pressure reading. For example, two gasolines having the same vapor pressure but different viscosities will exhibit a different pressure in the paired capillary device but this difference can be reduced to almost zero by adjusting the length of the tube 27. Changes in tube length have a much greater effect upon the more viscous liquid so that, when adjusted, the values will almost coincide.

In an example of operation of the modification of the vapor pressure apparatus shown in Fig. 2, the apparatus was operated under a positive pressure of 30 pounds per square inch at the inlet sample line and the liquid and vapors were exhausted to atmosphere. Inlet capillary 10 consisted of a 15 foot tube having an inside diameter of 0.03 inch and was operated at a temperature between 60° and 80° F. The coiled tube 27 consisted of $\frac{1}{8}$ inch outside diameter tubing. The constant temperature bath was maintained at a temperature of 140° F. The outlet capillary tube consisted of a 5 feet long coil of 0.03 inch inside diameter capillary tubing. Gasolines were flowed into the apparatus at a rate of about one gallon per hour. The apparatus was employed with marked success in the blending of gasolines. In addition to the described and inherent advantages of the continuous vapor pressure instrument in aiding gasoline and blending operations, it was found that deviation in results for a given sample was less than that when successive readings were taken on the standard Reid vapor pressure testing apparatuses.

Fig. 3 is a representation of a chart obtained when an instrument of the type above described was employed to identify diesel fuel, furnace oil, heater oil and power fuel as it flows through a sample line, such as line 5. As can be seen from observation of the instrument line or isotherm at the beginning of the test and for a period of approximately 10 minutes thereafter, furnace oil was flowing through the employed sample line. Thereafter heater oil and subsequently a high speed diesel fuel was flowed through the line 5. It is noted that the power fuel is widely separated from the other constituents and that between the several petroleum products a relatively sharp break and prompt announcement of the change occurs. The constant temperature bath is maintained at 200° C. during this examination and a 12 foot outlet capillary tube at substantially the same temperature was employed.

Having described our invention, we claim:

1. An apparatus for automatically and continuously determining the vapor pressure of liquids and providing appropriate response to variations therein, the said apparatus comprising, in combination, a vaporizing chamber, a heating means for said chamber and associated equipment, a thermostatic device that is directly associated with the said chamber and controls the heating means so as to maintain the chamber at a constant temperature, an inlet capillary tube connected at one end to a source of liquid and forming at the other end an inlet to said chamber, a single outlet capillary tube of adjusted length and inside diameter that is heated by the said heating means and maintained thereby at substantially constant temperature, and is connected at one end to the said vaporizing chamber to form the sole outlet for mixed liquids and vapors, the inner surface of said passage being interrupted to prevent streamlined flow, means for introducing liquid into the apparatus at a constant pressure and for establishing a positive pressure differential between said inlet capillary and said outlet capillary, and a pressure gauge that is operatively attached to the said apparatus in such position that it will respond to changes in back pressure therein created by the resistance of the said outlet capillary to the flow of said liquids and vapors.

2. An improved apparatus for automatically and continuously determining the vapor pressure of liquids and controlling associated apparatus in response thereto, the said apparatus comprising, in combination, a pair of associated capillary tubes so disposed as to provide series flow passage, a vaporizing chamber disposed therebetween and having a single outlet for mixed liquids and vapors, the outlet being one of said pair of capillary tubes, a constant temperature bath substantially surrounding the second capillary and vaporizing chamber, the inner surface of said passage being interrupted to prevent streamlined flow, a thermostatic device controlled by changes in temperature in said bath, a heating means controlled by said thermostatic device and arranged to provide heat to liquid in said chamber and capillaries, means for maintaining a liquid pressure at said inlet capillary higher than the pressure at said outlet capillary, a pressure gauge that is operatively attached to said chamber and is responsive to changes in pressure therein, and relay means connected to said gauge whereby therewith associated apparatus can be controlled by said vapor pressure changes.

3. Apparatus for automatically determining the varying vapor pressure of a flow of liquids and providing appropriate response to variations therein, comprising, in combination, a vaporizing chamber, a constant-temperature bath in which the said chamber is immersed, a thermostatic device that is directly associated with the said chamber and controls heating means for the said constant temperature bath, a flow restricting means disposed between a source of liquid to be tested and the chamber to maintain a uniform flow, an elongated tubular passage of selected length disposed between said flow restrictive means and said chamber, and also immersed in said bath, a single outlet capillary tube of adjusted length and inside diameter that is heated to constant temperature by said bath and is connected at one end of the said vaporizing chamber to form the sole outlet for vapor-liquid mixtures, the inner surface of said passage being interrupted to prevent streamlined flow, a pump to introduce liquid into the apparatus at a constant pressure and to force liquid through the aforesaid apparatus, and a gauge operatively attached to the apparatus so as to respond to changes in back pressure caused by the resistance of the outlet capillary to flow of said vapor-liquid mixtures in varying proportions.

4. An apparatus for automatically determining the vapor pressure of liquids, the said apparatus comprising, in combination, a vaporizing chamber having an inlet through which liquid is introduced into said chamber, a single restrictive passage providing the sole outlet for fluids in mixed liquid and vapor state from said chamber, the inner surface of said passage being interrupted to prevent streamlined flow, a pressure sensitive device operatively attached to the said chamber and responsive to changes in pressure therein to influence control means with relation to said changes, and means for maintaining the pressure-temperature relationship within the said chamber in a predetermined range such that the tested liquid will partially vaporize.

5. The apparatus of claim 4 in which the said interruptions in the inner surface of the restricted passage are formed by at least one small chamber of larger inside diameter than the remainder of the restricted passage and disposed in the line of flow formed by the said passage.

6. A method of determining the vapor pressure of a liquid, which method comprises introducing said liquid at constant pressure and a substantially uniform flow through the first of two zones of resistance to flow in series, heating the said liquid in the first said zone to a temperature approaching the vaporizing temperature of the liquid, maintaining the second said zone at a substantially constant temperature high enough to effect a partial vaporization of the liquid, flowing the resulting fluids in mixed vapor and liquid state through the second zone of resistance uniformly in the form of a froth, and measuring the pressure of the flowing fluids at a point just preceding the second said zone.

7. A method of determining the vapor pressure of a liquid that comprises withdrawing a sample stream of liquid from a source therefor, introducing the liquid at a uniform flow rate and pressure into a preheating zone, heating the liquid to a constant temperature therein, introducing the preheated liquid into a zone of resistance in flow, maintaining the liquid in the said zone of resistance at the said constant temperature, partially vaporizing the liquid as it flows through the said zones thereby forming a uniform froth of liquid and vapor, and measuring the pressure of the flowing froth at a point just preceding the zone of resistance to flow.

8. An apparatus for determining the vapor pressure of a liquid which apparatus comprises a first flow resistance means and a second flow resistance means, said first and second flow resistance means being arranged for series flow therethrough, means for introducing such liquid at constant pressure and at a substantially uniform flow through the first of said flow resistance means, means for heating the said liquid in the said first flow resistance means to a temperature approaching the vaporizing temperature of the liquid, a vaporizing chamber into which said first flow resistance means discharges, means for maintaining said second flow resistance means at a substantially constant temperature high enough to effect a partial vaporization of the liquid, means for flowing the resulting fluids in mixed vapor and liquid state through the said second flow resistance means uniformly in the form of a froth, and means for measuring the pressure of said flowing fluids at a point just preceding the said second flow resistance means.

9. An apparatus for determining the vapor pressure of a liquid which comprises means for withdrawing a sample stream of liquid from a source therefor, means for introducing the liquid at a uniform flow rate and pressure into a preheating means, means for heating the liquid to a constant temperature therein, means for introducing the preheated liquid into a vaporization means including a flow resistance means, means for maintaining the liquid in the said means at the said constant temperature, said temperature being sufficient to vaporize the liquid as it flows through the said means thereby forming a uniform froth of liquid and vapor, and means for measuring the pressure of the flowing froth at a point just preceding the said flow resistance means.

ROBERT B. JACOBS.
SIXT FREDERICK KAPFF.

References Cited in the file of this patent

UNITED STATES PATENTS

| Number | Name | Date |
|---|---|---|
| 1,880,720 | Blackwood et al. | Oct. 4, 1932 |
| 2,002,101 | Valby et al. | May 21, 1935 |
| 2,126,052 | Smith | Aug. 9, 1938 |